United States Patent [19]

Hung et al.

[11] Patent Number: 5,661,465
[45] Date of Patent: Aug. 26, 1997

[54] ALIGNMENT SYSTEM

[75] Inventors: Shum Siew Hung; Chu Ka Nam, both of Singapore, Singapore

[73] Assignee: Port of Singapore Authority, Singapore, Singapore

[21] Appl. No.: 186,306

[22] Filed: Jan. 24, 1994

[30] Foreign Application Priority Data

Mar. 25, 1993 [GB] United Kingdom ............... 9306194

[51] Int. Cl.⁶ .................................................. G08B 21/00
[52] U.S. Cl. .......................... 340/686; 340/525; 340/691; 340/988; 414/401
[58] Field of Search .............................. 340/686, 901, 340/932.2, 691, 685, 326, 332, 524, 525, 988, 438; 414/401; 455/345, 67.7; 342/23, 27, 33, 41; 359/155, 157; 212/153; 180/168; 364/424.02, 424.07

[56] References Cited

U.S. PATENT DOCUMENTS

| | | | |
|---|---|---|---|
| 2,173,137 | 9/1939 | Sharma | 212/98 |
| 2,572,725 | 10/1951 | Hirsch | 342/33 |
| 3,732,555 | 5/1973 | Strenglein | 340/539 |
| 4,602,357 | 7/1986 | Yang et al. | 340/574 X |
| 4,843,373 | 6/1989 | Trickle et al. | 340/686 X |
| 4,999,604 | 3/1991 | Crews | 340/988 X |
| 5,021,765 | 6/1991 | Morgan | 340/539 |
| 5,142,658 | 8/1992 | McMorran et al. | 414/401 X |
| 5,194,843 | 3/1993 | Jones et al. | 340/539 X |
| 5,198,800 | 3/1993 | Tozawa et al. | 340/685 X |

FOREIGN PATENT DOCUMENTS

| | | | |
|---|---|---|---|
| 2563028 | 10/1985 | France | 340/932.2 |
| 2328751 | 12/1973 | Germany | 414/401 |
| 208257 | 3/1984 | Germany | 340/988 |
| 68396 | 3/1994 | Japan | 340/932.2 |
| 1311308 | 7/1969 | United Kingdom . | |
| 1399441 | 3/1972 | United Kingdom . | |
| 2154387A | 2/1984 | United Kingdom . | |
| 2181610 | 4/1987 | United Kingdom | 340/686 |
| WO83/02165 | 6/1983 | WIPO . | |

Primary Examiner—Thomas Mullen
Attorney, Agent, or Firm—Klarquist Sparkman Campbell Leigh & Whinston, LLP

[57] ABSTRACT

An alignment system for use in aligning a first object with a second object, which system comprises a transmitter (6) for transmitting a directable signal, mounted on either the first object or the second object, a receiver (8, 9) for receiving the signal, mounted on the other of the first object or the second object and an indicator (12, 13) for indicating that a signal from the transmitter (6) has been received by the receiver (8, 9). Preferably, a single pair of transmitters (6) is mounted on a crane (7), a single pair of receivers (8) is mounted on a prime-mover (3) and a plurality of pairs of receivers (9) are mounted on a chassis (4) at intervals corresponding to positions midway along the lengths of each of a plurality of containers (2) supported by the chassis (4). Alignment of the transmitter (6) with the receiver (8) on the prime-mover (3) activates an indicator (12) for indicating that the movement of the prime-mover (3) is to be slowed. Alignment of the pair of transmitters (6) with one of the pair of receivers (9) on the chassis (5) activates an indicator (13) for indicating that the crane (7) is correctly aligned with a container (2) and that movement of the prime-mover (3) should, therefore, be stopped. The indicators (12, 13) and receivers (8, 9) form part of a control circuit (15). Also, a control circuit (15) for aligning a first object, such as a chassis (4) with a second object, such as a crane (7).

17 Claims, 4 Drawing Sheets

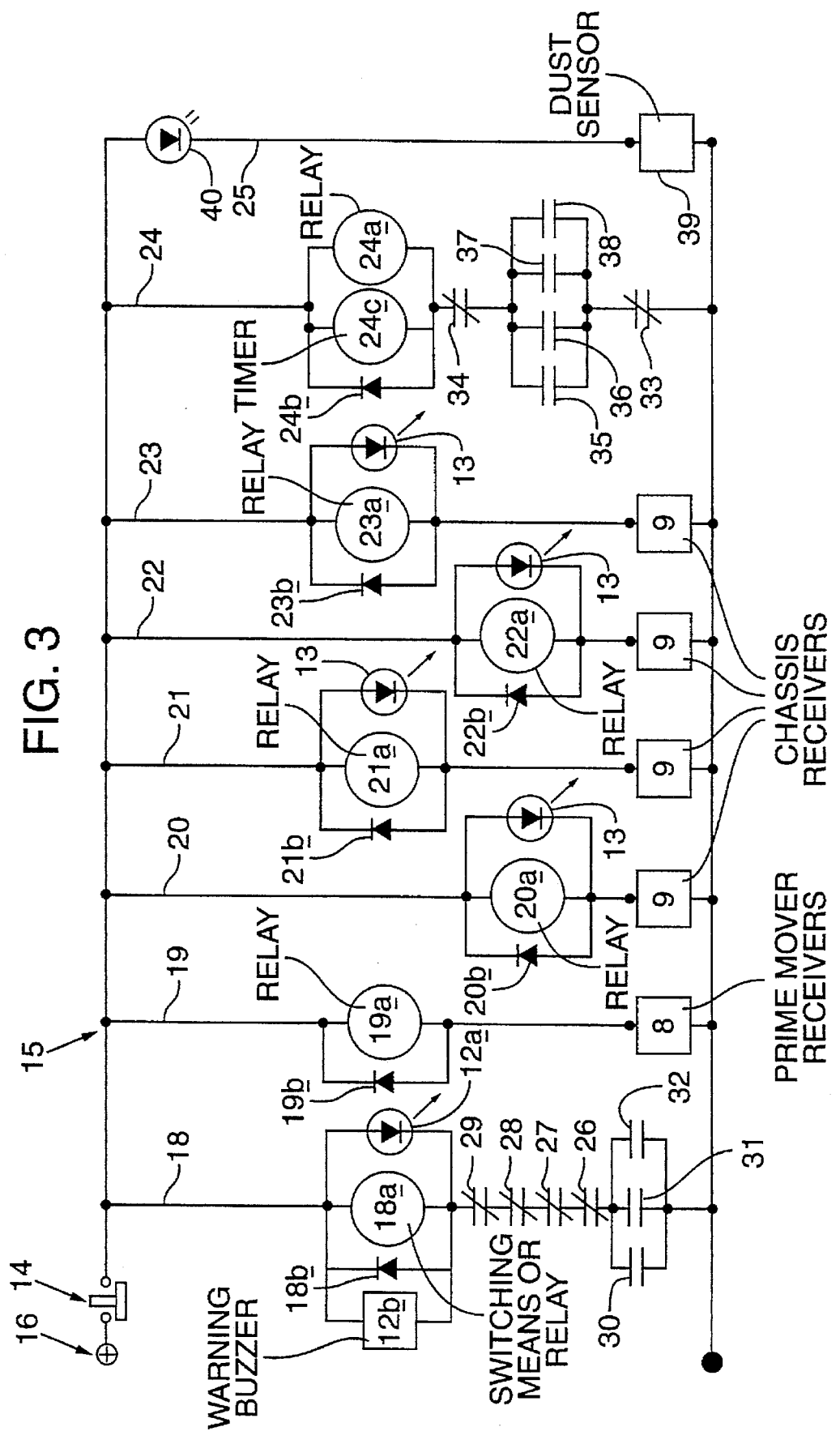

ALIGNMENT SYSTEM

BACKGROUND OF THE INVENTION

The present invention relates to an alignment system for positioning a first object with respect to a second object and more particularly to an alignment system for aligning a chassis for holding containers with respect to a container-handling equipment.

Drivers of vehicles for transporting containers often have trouble in positioning the containers (usually supported on the vehicle by a chassis) below container-handling equipment, such as a crane. Until now drivers have had to rely on the hand signals of fellow workers in order to align the chassis for holding containers correctly under the container-handling equipment. This is a time-consuming and unreliable process and often requires a certain amount of trial and error.

SUMMARY OF THE INVENTION

An aim of the present invention is, therefore, to assist drivers in aligning containers under container-handling equipment, such as a crane, more quickly and more efficiently and without the aid of fellow workers.

According to the present invention, there is provided an alignment system for use in aligning a first object with a second object, which system comprises a transmitter, for transmitting a directable signal, mountable on either the first object or the second object, a receiver for receiving the signal, mountable on the other of the first object or the second object and an indicator for indicating that a signal from the transmitter has been received by the receiver.

Preferably, the directable signal comprises a through-beam, infra-red signal.

Preferably, the first object comprises a chassis for holding containers, and the second object comprises container-handling equipment.

More preferably, the chassis is drawn by a prime-mover and the container-handling equipment comprises a crane.

Preferably, the indicator is mountable on a display panel.

More preferably, the display panel is mountable on the prime-mover, so that the driver of the prime-mover is readily able to see the indicator lights.

More preferably, an indicator comprises a light, bell and/or buzzer.

Preferably, a single pair of opposed transmitters is mounted on the container-handling equipment, a single pair of opposed receivers is mounted on the prime-mover and a plurality of opposed receivers are mounted on the chassis.

Preferably, the alignment system further comprises a plurality of indicators, an indicator being responsive to at least one receiver.

Preferably, the plurality of receivers are mounted at intervals along the chassis at positions corresponding to positions midway along the lengths of containers supportable by the chassis.

Preferably, at least one indicator and at least one receiver form part of a control circuit.

According to the present invention, there is also provided a control circuit for controlling alignment of a first object with a second object, which control circuit comprises at least one receiver, mountable on either the first object or the second object and adapted to receive a signal from a transmitter mountable on the other of the first object or second object, at least one indicator, and means for activating the at least one indicator in response to a signal from the transmitter being received, in use, by the at least one receiver.

Preferably, the control circuit comprises a first receiver, a first indicator responsive to the first receiver, and at least one second receiver, at least one second indicator responsive to the at least one second receiver, means for deactivating the first indicator in response to a signal received, in use, by the at least one second receiver and means for reactivating the first indicator a set period of time after the at least one second receiver, in use, no longer receives the signal.

According to the present invention, there is further provided a method of aligning a first object with a second object, which method comprises moving the first object with respect to the second object until a receiver, mountable on the first object or second object, is aligned with and receives a signal from a transmitter mountable on the other of the first object or second object, as indicated by an indicator.

BRIEF DESCRIPTION OF THE DRAWINGS

In order to illustrate the features and advantages of the present invention, the present invention will be further described, by way of example only, and with reference to the accompanying drawings, in which:

FIG. 3 shows an example of a control circuit for use with the alignment system of the present invention.

DETAILED DESCRIPTION OF PREFERRED EMBODIMENTS

Figure 1:
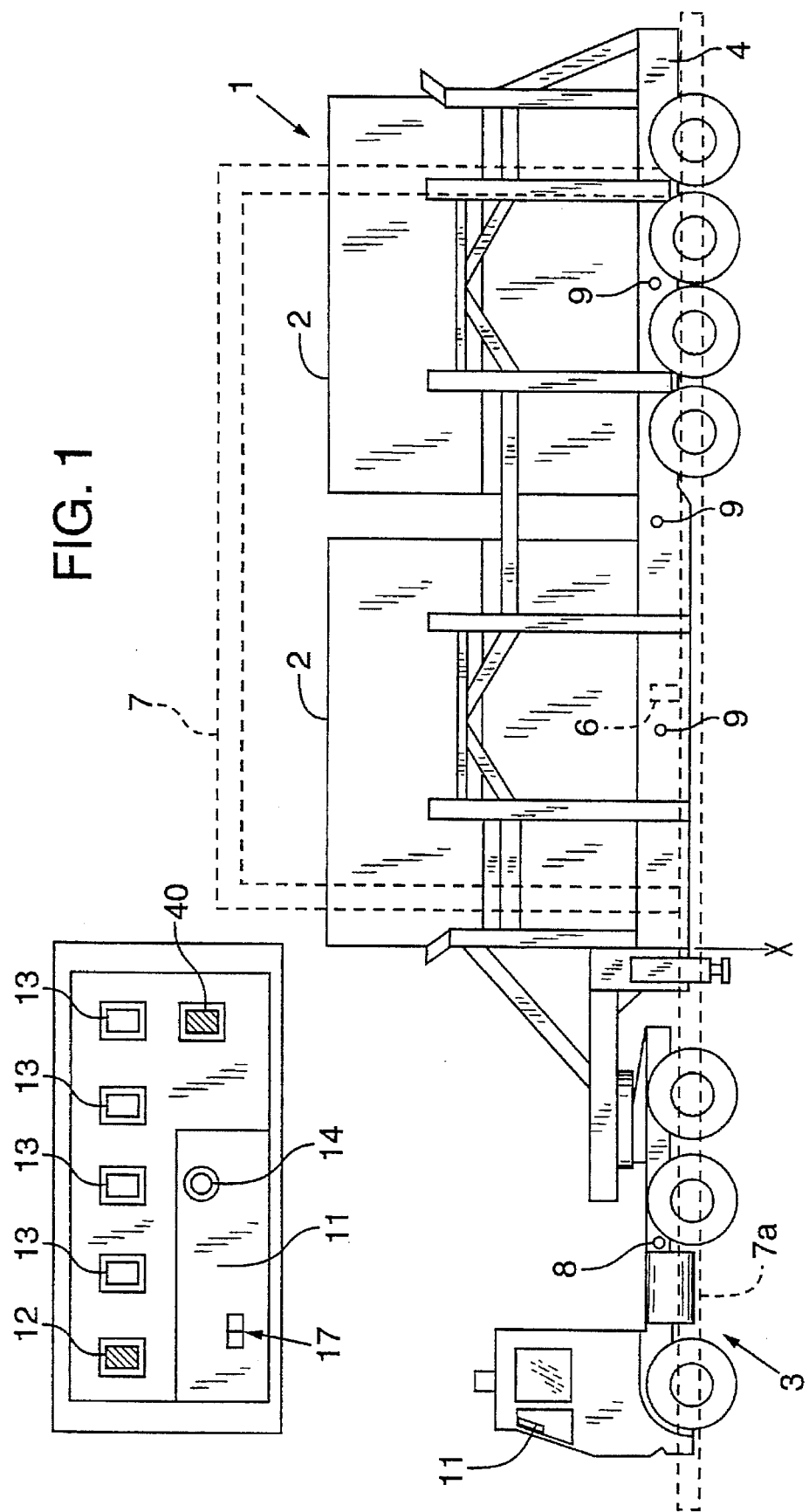
FIG. 1 shows a view from one side of the alignment system mounted according to one embodiment of the present invention.
Figure 2:
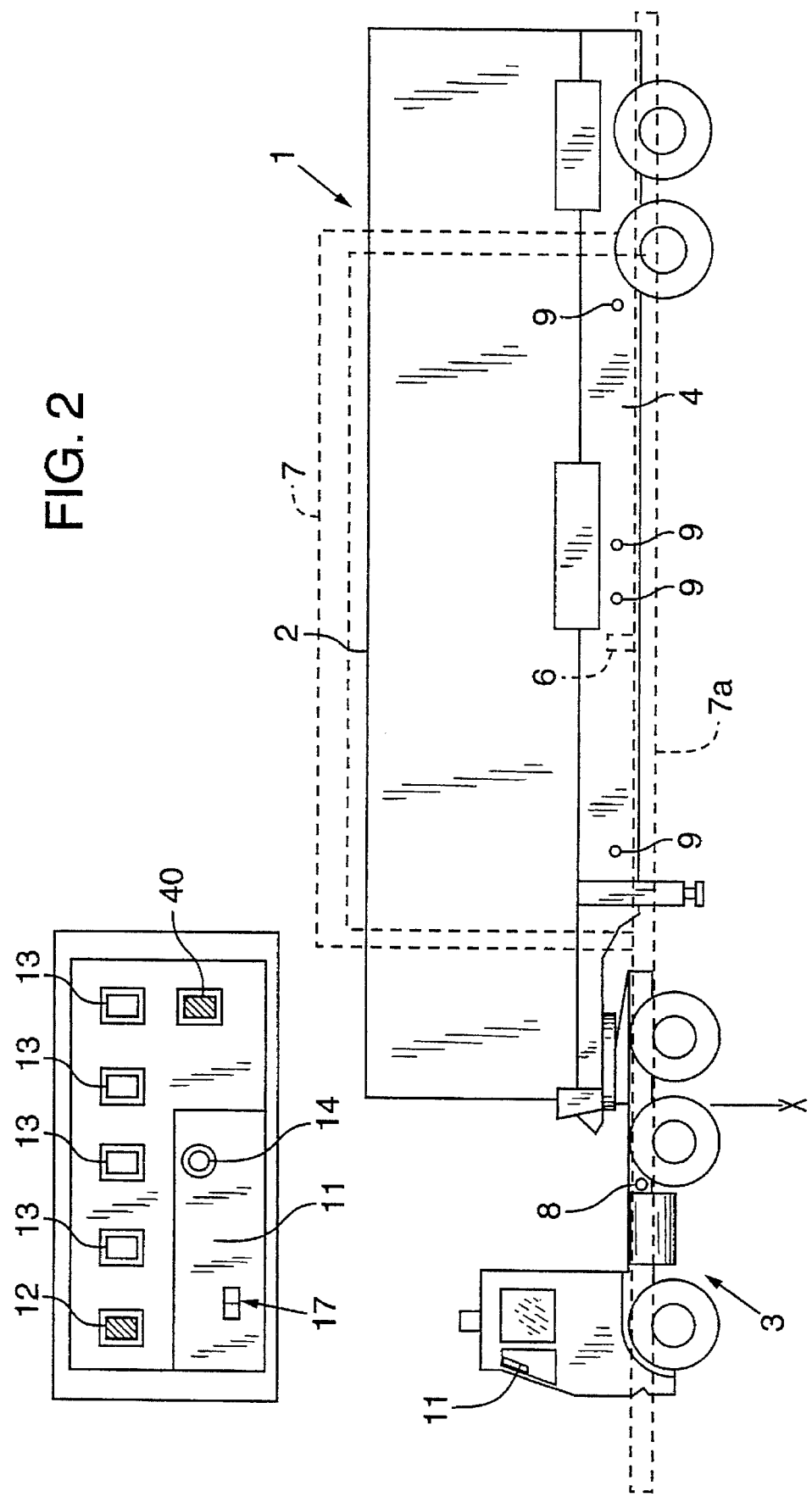
FIG. 2 shows a view from one side of the alignment system mounted according to a second embodiment of the present invention.
Figure 4A:
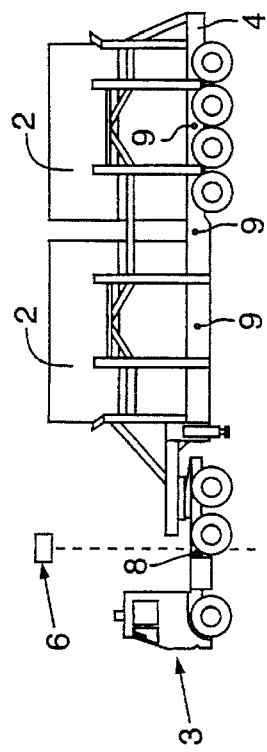
FIG. 4 shows an example of a method of aligning a first object with a second object using the alignment system of the present invention.
Figure 4B:
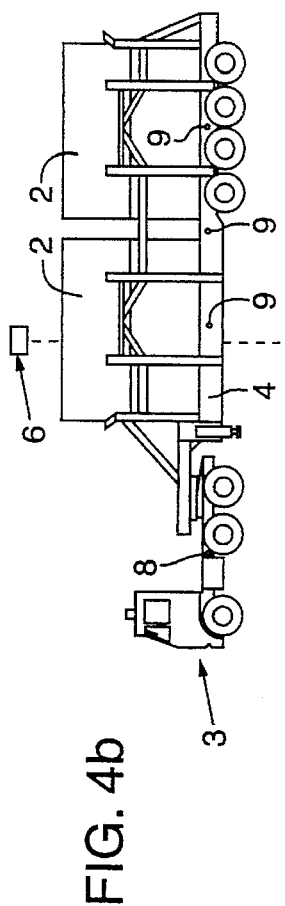
Figure 4C:
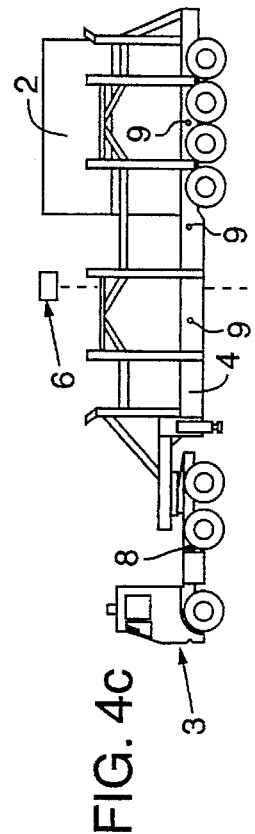
Figure 4D:
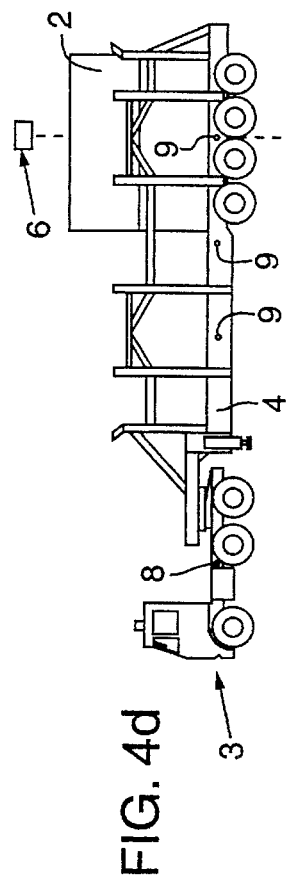

Referring to FIGS. 1 and 2, a vehicle 1 for transporting one or more containers 2 comprises a driving compartment or prime-mover 3 and a detachable chassis 4 for supporting one or more containers 2. The chassis 4 may be a double stack chassis, as shown in FIG. 1, or a single stack chassis, as shown in FIG. 2.

A container-handling crane 7 (illustrated schematically in FIGS. 1 and 2) extends over the prime-mover 3 and the chassis 4. A pair of opposed transmitters 6 for transmitting a directable signal, is mounted on a crane frame member 7a on each side of the crane 7. The opposed transmitters define a central horizontal axis (perpendicular to the plane of FIGS. 1 and 2) at an appropriate height (1.1 meters) above ground level. The directable signal transmitted by the transmitter 6 comprises an invisible through-beam infra-red signal.

A single pair of opposed receivers 8 is mounted on the prime-mover 3, one receiver 8 being mounted on each side of the prime-mover 3, on a central horizontal axis (perpendicular to the plane of FIGS. 1 and 2) and at the same height above ground level (1.1 meters) as the pair of transmitters 6 on the crane frame member 7a.

A plurality of pairs of opposed receivers 9 are mounted on the chassis 4, one receiver 9 of each pair of receivers being mounted on either side of the chassis 4 on a horizontal axis (perpendicular to the plane of FIGS. 1 and 2) and at the same height above ground level (1.1 meters) as the pair of transmitters 6 on the crane frame member 7a. The pairs of opposed receivers 9 may be mounted at intervals along the chassis 4, for example, at the positions shown in FIG. 1, i.e., at distances of 3.05 m, 6.1 m and 9.35 m from the front of the chassis 4 (marked X in FIG. 1). In FIG. 2, the pairs of opposed receivers 9 are mounted at intervals along the chassis 4, at positions corresponding to positions midway along the lengths of each of the plurality of containers 2 supported by the chassis 4, i.e., at distances of 3.05 m, 6.1 m, 6.86 m and 10 m from the front X of the chassis 4.

The transmitter 6 and the receivers 8, 9 are all dust-proof for maximum efficiency of signalling.

A plurality of indicators 12, 13 are mounted on a display panel or box 11, which is positioned in front of the driver in the prime-mover cabin 3. Each indicator 12, 13 on the display panel 11 is responsive to a single pair of receivers 8 or 9 and indicates that a signal from the pair of transmitters 6 on the crane 7 has been received by the pair of receivers 8 or 9 on the prime-mover 3 or chassis 4, respectively. The indicator 12, which is responsive to the single pair of opposed receivers 8 on the prime-mover 3 comprises a combined amber light and "slow-down" warning buzzer. Each of the indicators 13 is responsive to a single pair of receivers 9 on the chassis 4 and each indicator 13 comprises a red light. The red indicator lights 13 may be appropriately labelled on the display panel 11, for example, 3.05 m, 6.1 m and 9.35 m from the front X of the chassis 4, as in the case of the example shown in FIG. 1, or 3.05 m, 6.1 m, 6.86 m and 10 m from the point X of the chassis 4, as in the case of the example shown in FIG. 2.

In use, the prime-mover 3 may be driven towards the crane 7 as shown in FIG. 4. When a signal from the pair of transmitters 6 is received by the single pair of receivers 8 on the prime-mover 3 (step A in FIG. 4), the indicator 12 comprising the amber light and "slow-down" warning buzzer is automatically activated. This indicates to the driver of the prime-mover 3 that the prime-mover 3 is correctly aligned with the central horizontal axis of the crane 7 and that the prime-mover 3 should now be slowed in preparation for alignment of the chassis 4 with the crane 7.

The driver continues to move the prime-mover 3, slowly, with respect to the crane 7, until the pair of receivers 9 nearest the front X of the chassis 4, receives a signal from the pair of transmitters 6 on the crane 7 (step B in FIG. 4). At this point, the indicator 12 comprising the amber light and "slow-down" warning buzzer is automatically deactivated and a red indicator light 13, corresponding to the pair of receivers 9 which received the signal, is automatically activated. This indicates to the driver that the crane 7 is correctly aligned with a container 2. The driver, accordingly, stops the prime mover 3, and the crane 7 is then able to carry out handling of the container 2 (or containers 2 in the case of a double-stack chassis) positioned between the receivers of the pair of receivers 9 that received the signal.

Following handling of the container 2 by the crane 7, the driver continues to move the prime-mover 3, slowly, with respect to the crane 7 (step C in FIG. 4), until the receivers of another pair of receivers 9 on the chassis 4 positioned on either side of a container 2 receive a signal from the pair of transmitters 6 on the crane 7 (step D in FIG. 4). The sequence of events continues as described above until all of the pairs of receivers 9 have received a signal from the pair of transmitters 6, and until all of the plurality of containers 2 positioned between the receivers of each pair of receivers 9 have been handled.

If, for any reason, the prime-mover 3 overshoots, and the desired pair of receivers 9 is no longer aligned correctly with the pair of transmitters 6, the indicator 12 comprising the amber light and "slow-down" warning buzzer is automatically reactivated until a pair of receivers 9 is aligned with the pair of transmitters 6.

Following an operation of the kind described above, the indicator lights 12, 13 may be switched back to their original starting positions by simply pressing a reset button 14 mounted on the display panel 11.

A display panel control circuit 15 for use with an alignment system according to the present invention is shown in FIG. 3. The control circuit 15 is operated by means of a battery 16 provided in the prime-mover 3, for example a 12 V battery, and the control circuit 15 is switched on and off by means of a control switch 17 on the display panel 11.

Referring to FIGS. 3 and 4, an example of a complete operating cycle of the control circuit 15 in which there are four pairs of receivers 9 mounted on the chassis 4 at distances of 3.05 m, 6.1 m, 6.86 m and 10 m from the front X of the chassis 4, respectively, will now be described.

The control circuit 15 shown in FIG. 3 is supplied by a 12 V battery 16 in the prime-mover 3 and is divided into eight branches 18, 19, 20, 21, 22, 23, 24, and 25, which branches are arranged in parallel.

The first branch 18 of the control circuit 15 comprises a switching means or relay 18a, a diode 18b, as well as a light-emitting diode or amber indicator light 12a and a slow-down warning buzzer 12b. The amber indicator light 12a and slow-down warning buzzer 12b together comprise the indicator 12 on the display panel 11. In addition, this "slow-down warning" branch 18 of the control circuit 15 comprises four normally closed relay contacts 26, 27, 28 and 29, two normally open relay contacts 30 and 31 and one normally open timer contact 32. The two normally open relay Contacts 30 and 31 and the normally open timer contact 32 are arranged in parallel with one another, and the normally closed relay contacts 26, 27, 28 and 29 are arranged in series with one another. The normally open contacts 30, 31 and 32 are arranged in series with the normally closed contacts 26, 27, 28 and 29. Each of the normally closed relay contacts 26, 27, 28 and 29 is associated with a respective branch 20, 21, 22 or 23 (i.e., the third, fourth, fifth or sixth branch) of the control circuit 15, each of which branches 20, 21, 22 and 23, in turn, includes a respective pair of receivers 9 mounted on the chassis 4.

The second branch 19 of the control circuit 15 is connected to the pair of receivers 8 on the prime-mover 3 and comprises a relay 19a and a diode 19b.

The third branch 20 of the control circuit 15 is connected to the pair of receivers 9 nearest the front X of the chassis 4 (i.e., 3.05 m from the front X of the chassis 4, as shown in FIG. 2) and comprises a relay 20a, a diode 20b and a light-emitting diode or red indicator light 13.

The fourth, fifth and sixth branches 21, 22 and 23 of the control circuit 15 are connected to the pairs of receivers 9 positioned at distances of 6.1 m, 6.86 m and 10 m from the front X of the chassis 4, respectively. Each branch 21, 22 and 23 of the control circuit 15 also comprises a relay, 21a, 22a and 23a, respectively, a diode 21b, 22b and 23b, respectively, and a light-emitting diode or red indicator light 13, respectively.

The seventh branch 24 of the control circuit 15 comprises a relay 24a, a diode 24b and a timer 24c. This "timer" branch 24 of the control circuit 15 also comprises two normally closed relay contacts 33 and 34 and four normally open relay contacts 35, 36, 37 and 38. The normally open relay contacts 35, 36, 37 and 38 are arranged in parallel with one another and are, in turn, arranged in series with the normally closed relay contacts 33 and 34. Each of the normally open relay contacts 35, 36, 37 and 38 is associated with a respective branch 20, 21, 22 or 23 (i.e., the third, fourth, fifth or sixth branch) of the control circuit 15, each of which branches 20, 21, 22 and 23, in turn, includes a respective pair of receivers 9 mounted on the chassis 4.

The eighth branch 25 of the control circuit 15 comprises a dust sensor 39 mounted on the chassis 4 and a light-emitting diode or green indicator light 40 mounted on the display panel 11. Activation of the green indicator light 40 indicates that one or more of the pairs of receivers 9 require servicing, and the green indicator light 40 may be activated in response to a signal received from the dust sensor 39.

When a signal is received by the pair of receivers 8 on the prime-mover 3 (step A in FIG. 4), relay 19a associated with the branch 19 of the control circuit 15 connected to the pair of receivers 8 on the prime-mover 3 is activated, and the first normally open relay contact 30 in the "slow-down warning" branch 18 of the control circuit 15 is closed. Closing of the normally open relay contact 30 energizes the "slow-down warning" branch 18 of the control circuit 15. A second normally open relay contact 31 in the "slow-down warning" branch 18 of the control circuit 15 is also closed at this point, and this latches the relay 18a associated with the "slow-down warning" branch 18 into an energized state. The indicator 12 comprising the amber light 12a and slow-down warning buzzer 12b is, therefore, also activated, and because the relay 18a has been latched into an energized state by the closing of the second normally open relay contact 31, the indicator 12 will remain activated even when the signal to the pair of receivers 8 on the prime-mover 3 has been removed and the relay 19a in the branch 19 of the control circuit 15 connected to the pair of receivers 8 has been de-energized. Thus, the indicator 12 remains activated as the prime-mover 3 moves slowly to align the first pair of receivers 9 on the chassis 4 with the pair of transmitters 6 on the crane 7 (steps A to B in FIG. 4).

When the first pair of receivers 9, which are positioned nearest to the front X of the chassis 4, receives a signal, the relay 20a associated with the branch 20 of the control circuit 15 connected to this first pair of receivers 9 is activated and this, in turn, activates the corresponding light-emitting diode or red indicator light 13. A first normally closed contact 26 in the "slow-down warning" branch 18 of the control circuit 15 is opened, and this has the effect of de-activating the latched relay 18a of the "slow-down warning" branch 18, thereby deactivating the indicator 12 comprising the amber indicator light 12a and slowdown warning buzzer 12b. The normally open relay contacts 30 and 31, which were closed when the pair of transmitters 8 on the prime-mover 3 received a signal, are now reopened. Thus, as soon as the pair of receivers 9 nearest the front X of the chassis 4 receives a signal from the pair of transmitters 6 on the crane 7, the indicator 12 comprising the amber indicator light 12a and slow-down warning buzzer 12b is automatically deactivated, and the corresponding red indicator light 13 is automatically activated. At this point, the crane 7 is able to handle the container(s) 2, positioned between the receivers of the pair of receivers 9 which received the signal.

A signal received by the pair of receivers 9 nearest the front X of the chassis 4 also closes a first normally open relay contact 35 in the "timer" branch 24 of the control circuit 15. This energizes the "timer" branch 24 and activates the "timer" relay 24a and the timer 24c. As soon as the prime-mover 3 begins to move the chassis 4 so as to align the next (i.e., the second) pair of receivers 9 with the pair of transmitters 6 on the crane 7 (step C in FIG. 4), the pair of receivers 9 nearest the front X of the chassis 4 will no longer receive a signal. The relay 20a in the branch 20 of the control circuit 15 connected to the pair of receivers 9 nearest the front X of the chassis 4 is consequently de-energized, and the red indicator light 13 will be deactivated. The normally closed relay contact 26 in the "slow-down warning" branch 18 of the control circuit 15, which was opened when the pair of receivers 9 nearest the front X of the chassis 4 received a signal, is closed again, but the "slow-down warning" branch 18 of the control circuit 15 is not yet energized because all three normally open contacts 30, 31 and 32 are still open.

At this point the timer 24c in the "timer" branch 24 of the control circuit 15 is set so as to close the timer contact 32 in the "slow-down warning" branch 18 of the control circuit 15 a selected period of time (five seconds in the example shown in FIG. 3) after de-energization of the branch 20 of the control circuit 15 connected to the pair of receivers 9 nearest the front X of the chassis 4. Closing of this normally open timer contact 32 in the "slow-down warning" branch 18 of the control circuit 15 reactivates the relay 18a in the "slow-down warning" branch 18 of the control circuit 15, so that the indicator 12 comprising the amber indicator light 12a and slow-down warning buzzer 12b is also reactivated, 5 seconds after the pair of receivers 9 closest to the front X of the chassis 4 no longer receives a signal. The indicator 12 remains activated until the second pair of receivers 9 (positioned at a distance of 6.1 m from the front X of the chassis 4) receives a signal from the pair of transmitters 6 on the crane 7 (Step D in FIG. 4).

The cycle then continues in the same way as described previously, except that the branch 21 of the control circuit 15 connected to the second pair of receivers 9 is involved instead of the branch 20 connected to the first pair of receivers 9. Thus, when a signal is received by the second pair of receivers 9, the relay 21a of the branch 21 of the control circuit 15 connected to the second pair of receivers 9 is activated, as is the corresponding red indicator light 13. At the same time, a second normally closed contact 27 in the "slow-down warning" branch 18 of the control circuit 15 is opened, and the "slow-down warning" branch 18 of the control circuit 15 and the indicator 12 comprising the amber indicator light 12a and slow-down warning buzzer 12b are consequently deactivated. The timer contact 32 in the "slow-down warning" branch 18 of the control circuit 15 is reopened. At this point the crane 7 is able to handle the container(s) 2 positioned between the receivers of the pair of receivers 9 positioned 6.1 m away from the point X of the chassis 4.

A signal received by the second pair of receivers 9 also opens a second relay contact 36 in the "timer" branch 24 of the control circuit 15, thereby energizing the "timer" branch 24, and activating the "timer" relay 24a and the timer 24c. As soon as the second pair of receivers 9 no longer receives a signal from the pair of transmitters 6 on the crane 7, the relay 21a and the red indicator light 13 in the branch 21 of the control circuit 15 connected to the second pair of receivers 9 are deactivated, the second normally closed relay contact 27 in the "slow-down warning branch" 18 is closed again, and the timer 24c in the "timer" branch 24 is set for five seconds, after which the timer contact 32 in the "slow-down warning" branch 18 of the control circuit 15 is closed, thereby re-energizing the "slow-down warning" branch 18 and reactivating the indicator 12 comprising the amber indicator light 12a and slow-down warning buzzer 12b.

The cycle continues in this way as each consecutive pair of receivers 9 receives a signal from the pair of transmitters 6 on the crane 7, until the operation cycle is complete and all the plurality of containers 2 on the chassis 4 have been handled. Each pair of receivers 9 on the chassis 4 is connected to a different branch 20, 21, 22 or 23 of the control circuit 15, and each time a branch 20, 21, 22 or 23 of the control circuit 15 is energized due to a signal received by a pair of receivers 9 on the chassis 4, a corresponding red indicator light 13 is activated and a corresponding relay 26, 27, 28 or 29 in the "slow-down warning" branch 18 of the control circuit 15 is opened, so as to deactivate the indicator 12 comprising the amber indicator light 12a and slow-down warning buzzer 12b. At this point the crane 7 is able to handle the container(s) 2, positioned between the receivers of the pair of receivers 9 that received the signal. Furthermore, a corresponding timer contact 35, 36, 37 or 38 in the "timer" branch 24 of the control circuit 15 is also closed so as to activate the timer 24c and thereby reactivate the slow-down warning indicator 12 a set period of time (five seconds) after the pair of receivers 9 no longer receives a signal and the red indicator light in the branch 20, 21, 22 or 23 of the control circuit 15 connected to the pair of receivers 9 has been deactivated.

The branch 23 of the control circuit 15 connected to the last pair of receivers 9 on the chassis 4 (i.e., the pair of receivers 10 m away from the front X of the chassis 4) is also used to terminate the "timer" branch 24 and the "slow-down warning" branch 18 of the control circuit 15 until a new operation cycle starts again.

The period of time for which the timer 24c is set is based on the distance between each pair of receivers 9 and the front X of the chassis 4.

If, at any time, the operating cycle of the alignment system is terminated prematurely, or if the pair of receivers 9 furthest away from the front X of the chassis 4 is not activated, then the reset button 14 on the display panel 11 may be depressed. This interrupts the 12 V battery supply to the control circuit 15 and resets all of the relays 18a, 19a, 20a, 21a, 22a, 23a and 24a to their original starting positions.

The driver of the prime-mover 3 is, thus, able to align the plurality of containers 2 on the chassis 4 quickly and efficiently with respect to the crane 7, without relying on hand signals from fellow workers, so that the crane 7 is then able to carry out handling of the plurality of containers 2.

Typical performances of the above-described alignment system are within ±15 centimeters at a sensing distance of 25 meters. The performance of the alignment system is also typically within ±15° out of parallelism.

We claim:

1. An alignment system for use in aligning a first object having opposing sides relative to a second object having opposing sides, which system comprises:

a pair of opposed transmitters for transmitting signals mounted one on each of the opposing sides of the first object, the first object being a container-handling equipment;

a plurality of pairs of opposed receivers mounted one of each pair on each of the opposing sides of the second object, the second object being a chassis for holding containers and a prime-mover for driving the chassis, the plurality of pairs of opposed receivers including a pair of opposed receivers mounted one on each opposing side of the prime-mover, the plurality of pairs of opposed receivers including a pair of opposed receivers mounted one on each opposing side of the chassis at a position corresponding to a position mid-way along the length of a container carried by the chassis; and a plurality of indicators coupled to the plurality of pairs of opposed receivers, each of the plurality of indicators coupled to a different pair of receivers, each indicator responsive to a signal received by at least one receiver of a respective different pair of receivers, and the plurality of indicators being mounted on a display panel positionable in the prime-mover.

2. An alignment system for use in aligning a first object relative to a second object, which system comprises:

a transmitter operable to transmit a signal and being mounted on the first object;

a plurality of receivers operable to receive the signal and being mounted on the second object;

a control circuit including a first branch having a switching means, a first branch indicator, a normally open timer contact, at least one normally opened switching means contact and at least one normally closed switching means contact, a second branch having a switching means and at least one receiver of the plurality of receivers, the switching means of the second branch being operable in response to a signal received by the at least one receiver of the second branch to close the at least one normally open switching means contact in the first branch, thereby activating the first branch indicator, a third branch having a switching means, a timer and at least one normally open switching means contact and at least one fourth branch having a switching means, a fourth branch indicator and at least one additional receiver of the plurality of receivers, the switching means of the at least one fourth branch being operable in response to a signal received by the at least one additional receiver to open the at least one normally closed switching means contact in the first branch, thereby deactivating the first branch indicator and to close the normally open switching means contact in the third branch, thereby activating the timer, the timer capable of being set for a selected period of time and wherein the normally open timer contact in the first branch is closed at the selected period of time after the at least one additional receiver of the at least one fourth branch no longer receives a signal thereby deactivating the first branch indicator.

3. An alignment system according to claim 2, wherein the control circuit further comprises a fifth branch having a dust sensor and a fifth branch indicator, the fifth branch indicator being activatable in response to a signal received from the dust sensor.

4. An alignment system according to claim 2, wherein the first object comprises a container handling equipment and the second object comprises a chassis for holding containers, the chassis being drivable by a prime-mover and wherein the at least one receiver of the second branch is mounted on the prime-mover and the at least one additional receiver of the at least one fourth branch is mounted on the chassis, the selected period of time at which the timer is set being based on the distance between the at least one additional receiver in the at least one fourth branch and one end of the chassis.

5. A control circuit for controlling alignment of a first object relative to a second object, the control circuit comprising:

a plurality of receivers mounted on the second object and adapted to receive a signal from a transmitter mounted on the first object;

a plurality of indicators and means for activating at least one of the plurality of indicators in response to a signal from the transmitter being received by at least one of the plurality of receivers;

the plurality of receivers including a first receiver and a second receiver, and the plurality of indicators including a first indicator responsive to a signal received by the first receiver, and a second indicator responsive to a signal received by the second receiver; and means for deactivating the first indicator in response to a signal received by the second receiver and means for reactivating the first indicator at a selected period of time after the second receiver no longer receives the signal.

6. A control circuit according to claim 5, wherein the selected period of time is five seconds.

7. An alignment system comprising:

a signal transmitter operable to transmit a signal;

a plurality of receivers having a fixed spacing between adjacent receivers, and each of the receivers capable of receiving the signal;

the signal transmitter being mounted on a stationary first object and the plurality of receivers being mounted on a movable second object so that the plurality of receivers is movable relative to the signal transmitter; and an indicator coupled to at least one of the plurality of receivers, the indicator operable to indicate that the signal has been received by the at least one of the plurality of receivers.

8. An alignment system according to claim 7, wherein the indicator comprises a plurality of individual indicators, each individual indicator coupled with a different receiver of the plurality of receivers, each individual indicator indicating that the respectively coupled individual receiver has received the signal.

9. An alignment system according to claim 7, wherein the second object is movable in a direction relative to the first object, and the signal transmitter is configured to transmit the signal substantially perpendicular to the direction.

10. An alignment system according to claim 7, wherein the signal propagates in a linear beam shape.

11. An alignment system according to claim 7, wherein the signal comprises a through-beam infra-red signal.

12. An alignment system according to claim 7, wherein the signal transmitter and an additional signal transmitter are mounted one on each opposing side of the first object, the signal transmitter and additional signal transmitter facing inwardly and the plurality of receivers includes a plurality of pairs of outwardly directed receivers mounted one of each pair on opposing sides of the second object, the signal transmitter and additional signal transmitter being positioned outwardly of and spaced from the second object as the second object moves relative to the first object.

13. An alignment system according to claim 7, wherein the plurality of receivers are substantially horizontally co-planar with the signal transmitter.

14. An alignment system according to claim 7, wherein the indicator is part of a group of lights, bells and buzzers, the group being mounted on a display panel.

15. An alignment system according to claim 7, wherein the signal transmitter is mounted on a container-handling equipment and the plurality of receivers are mounted on a chassis for holding containers and a prime-mover for driving the chassis.

16. A method for aligning with a container handling device a chassis for holding containers pulled by an operator controlled prime mover in a predetermined path adjacent said device comprising the steps of mounting on said device a signal generating transmitter capable of projecting a signal into said path, mounting upon said prime mover a first receiver in a position to intercept said signal as said prime mover moves along said path and responsive to said signal when it intercepts the signal for generating a first operator notable warning, mounting upon said chassis a second receiver in a position to intercept said signal as said prime mover moves further along said path and responsive to said signal when it intercepts the signal for generating a second operator notable warning, whereby as a prime mover and chassis move past the container handling device the operator will be warned by said first warning to slow said prime mover, if appropriate, and subsequently will be warned by said second warning to bring said prime mover to a stop whereby said chassis will be positioned with said second receiver adjacent said container handling device.

17. A method as set forth in claim 16 including the steps of:

mounting upon said chassis a third receiver in a position to intercept said signal as said prime mover moves still further along said path and responsive to said signal when it intercepts said signal for generating a third operator notable warning, whereby the operator will be warned by said third operator notable warning to bring said prime mover to a stop whereby said chassis will be positioned with said third receiver adjacent said container handling device.

* * * * *